United States Patent
Schell et al.

(10) Patent No.: US 6,565,910 B1
(45) Date of Patent: May 20, 2003

(54) METHOD OF PREPARING FROZEN EGG BUTTER SAUCES

(76) Inventors: Lonny J. Schell, 302 Brookfield Dr., Dover, DE (US) 19901; Carmen J. Schell, 302 Brookfield Dr., Dover, DE (US) 19901

( * ) Notice: Subject to any disclaimer, the term of this patent is extended or adjusted under 35 U.S.C. 154(b) by 238 days.

(21) Appl. No.: 09/851,927

(22) Filed: May 10, 2001

(51) Int. Cl.⁷ .................................................. A23L 1/39
(52) U.S. Cl. ....................................... 426/589; 426/568
(58) Field of Search .............................. 426/589, 330.1, 426/330.6, 329, 327, 565, 568, 519

(56) References Cited

U.S. PATENT DOCUMENTS 4,420,495 A * 12/1983 Hammer et al. ............ 426/564
5,387,428 A * 2/1995 Chapman .................... 426/573

OTHER PUBLICATIONS

Online recipe, "Hollandaise Sauce", Copyright 2000 Television Food Network, Episode # FO1B07. http://www.food-network.com/foodtv/print/recipe/0,6255,15209,00.html.*

Online recipe, "Hollandaise Sauce", Copyright 1999 from "Every Day is a Party Cookbook" by Emeril Lagasse, Episode # EM1D59. http://www.foodnetwork.com/foodtv/print/recipe/0,6255,13032,00.html.*

Online recipe, "Bearnaise Sauce", Copyright 2001 Television Food Network, Episode # CL9726. http://www.food-network.com/foodtv/print/recipe/0,6255,17740,00.html.*

* cited by examiner

*Primary Examiner*—Keith Hendricks
(74) *Attorney, Agent, or Firm*—Mills Law Firm PLLC

(57) ABSTRACT

A method of making a temperature stable sauce based on butter and eggs includes stirring egg yolks until uniformly blended; combining at ambient temperature the blended egg yolks and liquid until said liquid is well incorporated; heating and mixing the mixture to preliminary temperature not exceeding 150° F., adding a first quantity of butter and returning to the temperature, and thereafter adding the remaining butter while increasing the temperature to about 160° F. until a thickened mixture is achieved; adding seasonings to said thickened mixture. The resulting sauce may be refrigerated or frozen without loss in texture, taste or appearance.

20 Claims, No Drawings

METHOD OF PREPARING FROZEN EGG BUTTER SAUCES

FIELD OF THE INVENTION

The present invention relates to preparation of cooking sauces, and, in particular, a method of preparing egg butter sauces in the hollandaise family of sauces.

BACKGROUND OF THE INVENTION

The fine cuisines of the world are often enhanced and emboldened by a wide variety of sauces. The sauces, however, are divided into a limited number of groups, or mother sauces, to which select ingredients are added for making derivatives of the final product. Generally, the groups comprise brown sauces, white sauces, tomato sauces, egg yolk and oil sauces, oil and vinegar sauces, and egg yolk and butters sauces. All but the later group may be prepared in batch quantities and held for extended periods through appropriate packaging, such as bottling, canning, and/or freezing. The egg yolk and butter sauces, on the other hand, have not been successfully packaged in usable form.

The preparation of the egg butter sauces requires a balanced sequencing of aerating an egg mixture accompanied by gentle heating until the mixture thickens, after which butter is gradually added to arrive at the desired consistency. By the addition of acidic and flavored liquids, herbs and spices, and other flavoring additives, the mother sauce may be expanded into a large family of sauces for use with meat, seafood, dairy products, and vegetables.

While considerable latitude may be employed by skilled chefs or accomplished cooks in arriving at a finished product, certain general processing conditions are regarded as essential. First, excessive heat must be avoided to prevent curdling of the eggs; butter is added controlledly to avoid separation; and proper aeration is needed for consistency. These guidelines are subject to wide acceptable variances such that sauces deemed acceptable, vary in taste and texture due to the subjective interrelationships of the processing variables. Further, the egg butter sauces have limited storage times before deleterious effects of separation occur. Accordingly, even in fine restaurants, the sauces are provided only on an as-needed basis, because of the instability of the product. The problems have persisted when fully prepared egg butter sauces are stored at refrigerator or freezer temperatures. As frozen articles due to deterioration, these sauces have been primarily used as enrichments for white sauces. When used for the primary purpose, elaborate reconstitution is required, and the results have been problematic.

Recognizing and notwithstanding the foregoing limitations, various approaches have been proposed for permitting the use of frozen constituents for egg butter sauces. U.S. Pat. No. 4,420,495 to Hammer et al. discloses a method for freezing a prepared mixture of the base ingredients for the desired sauce, thawing the mixture, and, with specialized equipment, aerating the prepared mixture to achieve the requisite air volume to provide the foaminess characteristic of these sauces. U.S. Pat. No. 5,387,428 to Chapman discloses that the resultant product from the thawed mixture provides a low texture and flavor over time. Separation is also disclosed as a resultant problem. To overcome the limitations of the Hammer process, the patent proposes making a preliminary base of all the end ingredients with the exception of the fat or butter constituent. The preliminary base may be frozen for prolonged storage. The final sauce is prepared by thawing the base and incorporating liquid butter to form an intermediate mixture. The intermediate mixture is then homogenized by high shear mixing until the desired foamy sauce is obtained. Both of the foregoing approaches require post thawing process for use.

In view of the foregoing, it would be desirable to provide a method for making egg butter sauces that can be readily prepared without specialized equipment, frozen for extended periods without a loss of properties, and directly used after thawing without subsequent processing and specialized equipment.

SUMMARY OF THE INVENTION

The foregoing is accomplished in the present invention by providing a method for making egg butter sauces wherein the completed product may be used immediately, or refrigerated or frozen for storage and thereafter used without additional processing. The method accommodates the mother sauce and derivatives. The method involves the initial whisking of the egg constituent until well blended and smooth. Only after the initial blending of the eggs is a liquid, water for the mother sauce and liquid additives for the derivatives, added and blended. The beaten egg and liquid mixture may be stored at ambient conditions. The mixture is transferred to a vessel, such as a double boiler, and uniformly heated at a simmering temperature not exceeding about 200° F. applied whereby a uniformly heated vapor heats the vessel surfaces contacting the prepared mixture and excessive heat that could cause coagulation is avoided. The mixture is whisked gently and constantly until a first processing temperature of about 150° F. is reached for an initial period without a thickening of the mixture. Thereafter, a portion of butter at ambient temperature is added and the enriched mixture, after slight cool down, returns to the first processing temperature. After return, the remaining portion of the butter is added while whisking until a final processing temperature of about 160° F. is attained. The whisking is maintained during the resulting thickening of the sauce for a final processing period until deep whisk marks are visible on the surface of the sauce. The foamed mixture is removed from heat and solid seasonings, additives, and herbs and spices incorporated. The completed mixture may be transferred to storage containers, refrigerated or frozen, and used, without further processing and with flavor and texture retention, after simple thawing in the refrigerator or a low heat.

Accordingly, it is an object of the present invention to provide a method for preparing egg butter sauces and derivatives for refrigerated storage without flavor and texture degradation.

Another object of the invention is to provide a controlled process for preparing and preserving egg butter and derivative sauces.

A further object of the invention is to provide a method for making egg and butter based sauces having extended storage life.

Yet another object of the invention is to provide a refrigerated egg butter sauce directly usable without subsequent processing, and without texture, taste or appearance degradation.

The above and other objects and advantages of the present invention will become apparent upon reading the following detailed description.

DETAILED DESCRIPTION OF THE PREFERRED EMBODIMENTS

Those in the cooking community will appreciate that the egg butter sauce is a mother sauce for a family of egg/butter foamed sauces used extensively as flavor enhancing vehicles for meat, poultry, seafood, dairy products, vegetables and other foods for providing a rich textured and flavored accompaniment. Included in the family are classic hollandaise and béarnaise sauces and derivatives therefrom, which may be enhanced with additional flavorings such as herbs, citrus flavorings, stocks and glazes for culinary pairing with the accompanied food product. The egg butter sauces may also be used as an ingredient in pastry recipes including piecrusts, scones, cookies and the like.

These products are accomplished by careful, sequenced and time and temperature controlled processing from initial aerating of the egg constituent; blending of liquids; uniform heating of the blended mixture to a preliminary processing temperature and addition of a portion of the butter constituent; heating to a secondary processing temperature with the addition of the remaining butter constituent and effecting a thickening of the mixture; addition of flavorings for the desired product; and packaging the product is usable form for refrigeration and/or freezing. The stored product may be used after thawing without subsequent processing and without a loss of taste, texture, consistency or color.

The proper sequencing of procedures, proportions of liquid/fat/egg, and progression of processing temperatures yields consistent palatable results. Initial aeration of the egg yolks prior to liquid blending provides stability. By volume, about 1 tablespoon liquid and 4 tablespoons of butter per egg yolk provide pleasing texture and palate. Most importantly, by providing uniform sequential heating at a tempering processing temperature of about 150° F. followed by thickening processing temperature not exceeding about 160° F. provides a resultant sauce that will withstand freezing and refrigeration without a loss of qualities.

EXAMPLE 1

Mother Sauce

Basic Egg Butter Sauce

Four egg yolks are placed off heat in the top of a double boiler. The egg yolks are blended until smooth in consistency. Four tablespoons of ambient temperature water, as the base liquid, are added to blended egg yolks and mixed until uniformly incorporated. The egg-liquid mixture is maintained at ambient temperature. The bottom of the double boiler is placed over simmering water regulated to maintain a temperature not in excess of about 200° F., with the base surface of the double boiler bottom spaced at least about one inch above the water surface. The top of the double boiler with the egg yolk water mixture is placed over the bottom and the mixture gently whisked as the temperature rises. The mixture is gradually heated while maintain whisking until the temperature reaches about 150° F., at which time eight tablespoons of whole, unsalted butter at ambient temperature are added to the mixture. The butter addition will slightly reduce the mixture temperature, and heating and gentle whisking is continued to return the mixture to a temperature of about 150° F. over a period of about two minutes. The temperature is monitored, and the heat regulated to avoid exceeding the aforementioned temperature. After the preliminary processing temperature is reestablished, 8 tablespoons of whole, unsalted butter at ambient temperature are added under gentle heating and whisking until a secondary processing temperature of about 160° F. is attained and the mixture begins to thicken. The temperature is monitored so as not to exceed the secondary processing temperature. During this processing any foam in the mixture will disappear and thickening will begin. Temperature control and whisking are maintained until the desired consistency of deep visible whisk marks on the top surface are observed, in a period of about three to five minutes, at which time the top is removed from the double boiler and set aside from the heat. One-half teaspoon of sugar and one-quarter teaspoon of salt are added to the thickened mixture and blended until fully incorporated. The finished sauce has a creamy and smooth texture evidencing thorough and uniform aeration. The finished sauce is placed in a storage container placed in an ice water bath to effect gradual cooling. Upon attaining firmness, the cooled product is stored under refrigerated or freezing conditions. After gradual thawing, the product retains the creamy and smooth texture of the finished product.

EXAMPLE 2

Egg Butter Lemon Sauce

An egg butter sauce was prepared in accordance with example 1 under two conditions. First, as the base liquid, 2 tablespoons of lemon juice and 2 tablespoons of water were utilized. The sauce was completed in accordance with the remaining steps in Example 1. Second, water was used as the base liquid and 2 tablespoons of lemon juice were added to the finished sauce. Both egg butter lemon sauces had a creamy and aerated texture and appearance and refrigerated and/or frozen without noticeable loss in properties.

EXAMPLE 3

Basic Hollandaise Sauce

As a base liquid, a mixture of 4 tablespoons white wine vinegar, 2 tablespoons water, 12 whole peppercorns, and one bay leaf were mixed, heated and reduced in volume to about 3 tablespoons. On tablespoon of water was added to the reduced mixture. The combined mixture was strained, cooled to ambient temperature, and added as the base liquid to the recipe of Example 1. After completion, the finished sauce was strained, adjusted with additional salt and cayenne pepper to taste, one tablespoon of lemon juice, and zest from one lemon. The completed product was packaged in a plastic container. Properties before and after refrigeration were comparable to the base sauce of Example 1 without a noticeable change in properties.

EXAMPLE 4

Basic Bearnaise Sauce

As the base liquid, a reduction of 1 tablespoon lemon juice, 1 teaspoon sugar, ½ cup minced shallots, ½ cup white wine vinegar, and one tablespoon chopped tarragon were reduce under gentle heating to 2 tablespoons of liquid. The reduction was strained and added to 2 tablespoons of water to create the base liquid, and a sauce was prepared in the method of Example 1. After completion, the finished sauce was strained, adjusted to taste with additional salt, pepper, and sugar and 3 tablespoons fresh tarragon admixed therewith for appearance and taste. The sauce was frozen, thawed and utilized, retaining initial creamy texture and aerated appearance without a diminution in properties.

It will be apparent that many variations may be made in accordance with culinary preferences using the above mother sauce and classic derivatives, using varying acetic complements including citrus, vinegars and wines, as well as addition of herbs, spices and other flavoring additives. By adhering to the controlled mixing, aeration, and heating as describe above, consistent quality and longevity is attained, allowing the convenient use of the family of sauces from refrigerated storage in an amount needed for the desired recipe and without elaborate "just-in-time" preparation in a minimum amount exceeding recipe requirements.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A frozen egg butter based sauce comprising: a frozen article comprising an aerated mixture of egg yolk and by volume per egg yolk of about 1 tablespoon liquid constituent, and 4 tablespoons fat constituent, said mixture being thermally processed by uniform heating to a first processing temperature of about 150° F. in the presence of a first portion of the fat constituent, and a second processing temperature of about 160° F. in the presence of the full portion of the fat constituent, wherein upon thawing, the sauce retains the flavor and texture properties of said sauce prior to freezing.

2. The egg butter based sauce as recited in claim 1 wherein said liquid constituent includes an acidic liquid.

3. The egg butter based sauce as recited in claim 2 wherein said fat constituent is butter.

4. The egg butter based sauce as recited in claim 3 wherein said butter is unsalted.

5. The egg butter based sauce as recited in claim 3 wherein said liquid constituent comprises water.

6. The egg butter based sauce as recited in claim 3 wherein said liquid constituent includes lemon juice and water.

7. The egg butter based sauce as recited in claim 6 wherein said liquid constituent includes flavoring additives.

8. The egg butter based sauce as recited in claim 7 wherein said flavoring additives include herbs.

9. The egg butter based sauce as recited in claim 8 wherein said herbs included tarragon.

10. The egg butter based sauce as recited in claim 5 wherein said liquid constituent includes a reduction of a mixture of lemon juice, shallots, vinegar and herbs.

11. The egg butter based sauce as recited in claim 10 wherein said vinegar is a wine vinegar.

12. The egg butter based sauce as recited in claim 11 wherein said vinegar is a white wine vinegar.

13. The egg butter based sauce as recited in claim 12 wherein said herbs include tarragon.

14. A method of making a temperature-stable sauce based on butter and eggs, said method comprising the steps of: stirring egg yolks until uniformly blended; combining at ambient temperature the blended egg yolks and a liquid to form a mixture; blending said mixture until said liquid is incorporated; placing said mixture into a vessel; heating said vessel uniformly and agitating said mixture to incorporate air a temperature not exceeding about 150° F. in a time period of about 3 minutes; adding a first quantity of butter to said mixture and maintaining said heating and agitating for an additional time period of about 2 minutes at a temperature not exceeding about 150° F.; adding a second quantity of said butter to said mixture while maintaining said blending and increasing the temperature of said mixture to an elevated temperature not exceeding about 160° F. for a third period until a thickened mixture is achieved; adding seasonings to said thickened mixture; transferring said thickened mixture into a container; and freezing said thickened mixture.

15. The method as recited in claim 14 wherein said first quantity of butter is substantially the same as said second quantity of butter.

16. The method as recited in claim 13 wherein by volume per egg yolk said liquid is about one tablespoon and said butter is about four tablespoons.

17. The method as recited in claim 14 wherein said liquid includes lemon juice.

18. The method as recited in claim 17 wherein said liquid includes a vinegar.

19. The method as recited in claim 18 wherein said liquid includes flavor additives.

20. The method as recited in claim 19 wherein said flavor additives include tarragon.

\* \* \* \* \*